United States Patent
Takeda

(10) Patent No.: US 11,643,571 B2
(45) Date of Patent: May 9, 2023

(54) COMPOSITION FOR FORMING WATER REPELLENT FILM, WATER REPELLENT FILM, SUBSTRATE WITH WATER REPELLENT FILM, AND ARTICLE

(71) Applicant: AGC Inc., Chiyoda-ku (JP)

(72) Inventor: Yosuke Takeda, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 543 days.

(21) Appl. No.: 16/274,281

(22) Filed: Feb. 13, 2019

(65) Prior Publication Data

US 2019/0177574 A1    Jun. 13, 2019

Related U.S. Application Data

(63) Continuation of application No. PCT/JP2017/027802, filed on Aug. 1, 2017.

(30) Foreign Application Priority Data

Aug. 19, 2016  (JP) .............................. JP2016-161075

(51) Int. Cl.

| C08L 83/08 | (2006.01) |
| C09D 183/08 | (2006.01) |
| C03C 17/30 | (2006.01) |
| C09K 3/18 | (2006.01) |
| C09D 171/00 | (2006.01) |
| C08G 77/54 | (2006.01) |
| C08G 65/336 | (2006.01) |
| C08G 65/00 | (2006.01) |
| C08L 83/12 | (2006.01) |
| C08G 77/24 | (2006.01) |

(52) U.S. Cl.
CPC ............ C09D 183/08 (2013.01); C03C 17/30 (2013.01); C08G 77/54 (2013.01); C09D 171/00 (2013.01); C09K 3/18 (2013.01); C03C 2217/76 (2013.01); C03C 2217/78 (2013.01); C08G 65/007 (2013.01); C08G 65/336 (2013.01); C08G 77/24 (2013.01); C08L 83/08 (2013.01); C08L 83/12 (2013.01)

(58) Field of Classification Search
CPC ............................ C09D 183/08; C08G 77/26
See application file for complete search history.

(56) References Cited

U.S. PATENT DOCUMENTS

| 6,706,906 B2 * | 3/2004 | Yoneda ................. | C09D 183/12 556/419 |
| 10,030,170 B2 * | 7/2018 | Wigglesworth ..... | C09D 183/08 |
| 10,570,291 B2 * | 2/2020 | Hamade ................ | C09D 5/1675 |
| 2002/0151645 A1 * | 10/2002 | Yoneda ................ | C09D 183/08 524/858 |
| 2011/0098402 A1 * | 4/2011 | Yamane ............... | C08G 65/336 524/521 |
| 2012/0077041 A1 * | 3/2012 | Yamane ............... | C09D 171/02 428/421 |
| 2014/0113145 A1 | 4/2014 | Yamane et al. | |
| 2014/0309329 A1 * | 10/2014 | Sawada ................ | C09D 5/1675 523/122 |
| 2015/0191629 A1 | 7/2015 | Matsuda et al. | |
| 2015/0240126 A1 * | 8/2015 | Wigglesworth ... | G03G 15/2057 524/588 |
| 2015/0274889 A1 | 10/2015 | Sakoh et al. | |
| 2015/0307719 A1 | 10/2015 | Mitsuhashi et al. | |
| 2015/0315443 A1 | 11/2015 | Takeda et al. | |
| 2018/0030280 A1 | 2/2018 | Mitsuhashi et al. | |

FOREIGN PATENT DOCUMENTS

| CN | 105175713 A | 12/2015 |
| JP | 2012-219217 | 11/2012 |
| JP | 2015-129230 | 7/2015 |
| JP | 5761305 | 8/2015 |
| JP | 2015-199906 | 11/2015 |
| JP | 5814209 | 11/2015 |
| JP | 2016-145326 | 8/2016 |
| WO | WO 2014/126064 A1 | 8/2014 |

OTHER PUBLICATIONS

International Search Report dated Sep. 5, 2017 in PCT/JP2017/027802 filed Aug. 1, 2017 (with English Translation).
Written Opinion dated Sep. 5, 2017 in PCT/JP2017/027802 filed Aug. 1, 2017.

* cited by examiner

*Primary Examiner* — Margaret G Moore
(74) *Attorney, Agent, or Firm* — Oblon, McClelland, Maier & Neustadt, L.L.P.

(57) ABSTRACT

There are provided: a composition for forming a water repellent film that can form a water repellent film not only excellent in water repellency but also excellent in abrasion resistance, particularly in abrasion resistance evaluated under close-to-actual-use conditions where a light resistance test is combined; a water repellent film formed by using the composition for forming a water repellent film; a substrate with a water repellent film including the water repellent film provided on at least part of a substrate; and an article including the substrate with a water repellent film. The composition for forming a water repellent film contains, at a predetermined quantitative ratio of a hydrolyzable silane compound (1) having a perfluoroalkyl group and having no ether bond; and a compound (21) that has a poly(oxyfluoroalkylene) group and a plurality of hydrolyzable silyl groups with a specific structure and that has a number average molecular weight of 3000 or more.

8 Claims, No Drawings

COMPOSITION FOR FORMING WATER REPELLENT FILM, WATER REPELLENT FILM, SUBSTRATE WITH WATER REPELLENT FILM, AND ARTICLE

CROSS-REFERENCE TO RELATED APPLICATIONS

This application is a continuation of prior International Application No. PCT/JP2017/027802 filed on Aug. 1, 2017 which is based upon and claims the benefit of priority from Japanese Patent Application No. 2016-161075 filed on Aug. 19, 2016; the entire contents of all of which are incorporated herein by reference.

FIELD

The present invention relates to a composition for forming a water repellent film, a water repellent film formed by using the composition for forming a water repellent film, a substrate with a water repellent film including the water repellent film on at least part of a substrate, and an article including the substrate with a water repellent film.

BACKGROUND

In various kinds of technical fields, there has been conventionally a need for imparting water repellency to a surface of a substrate. A typical method to impart water repellency is to form a water repellent coating film on the surface of the substrate, and techniques regarding a composition for forming such a coating film have been developed.

In particular, in a case where the substrate is a substrate of a transportation equipment article, such as automotive glass, imparting not only water repellency but also imparting durability such as abrasion resistance and weather resistance (typically light resistance) to the coating film is strongly required of the composition. As a composition that can form a water repellent film excellent in durability, there has been proposed a composition in which a hydrolyzable silane compound having a fluorine-containing polyether group is combined with a hydrolyzable silane compound having a fluorine-containing alkyl group (refer to Patent Reference 1; International Publication WO 2014/126064).

SUMMARY

According to the present inventor, the water repellent film formed by the composition specifically disclosed in Patent Reference 1 is insufficient in abrasion resistance, particularly in abrasion resistance evaluated under close-to-actual-use conditions where a light resistance test is combined.

The present invention was made from the above viewpoint, and its object is to provide a composition for forming a water repellent film that can form a water repellent film not only excellent in water repellency but also excellent in abrasion resistance, particularly in abrasion resistance evaluated under close-to-actual-use conditions where a light resistance test is combined (hereinafter, also referred to as "light and abrasion resistance"). It is another object to provide a water repellent film formed by using the composition for forming a water repellent film, a substrate with a water repellent film including the water repellent film on at least part of a substrate, and an article including the substrate with a water repellent film.

The following structures are the gist of the present invention.

[1] A composition for forming a water repellent film including:

a compound represented by Formula (1) below; and a compound represented by Formula (2) below and having a number average molecular weight of 3000 or more, wherein a molar ratio of a group $SiR^1_p X^1_{3-p}$ in the compound represented by Formula (1) and a group $SiR^2_r X^2_{3-r}$ in the compound represented by Formula (2) and having the number average molecular weight of 3000 or more ([the number of moles of $SiR^1_p X^1_{3-p}$ in the compound represented by Formula (1)]/the number of moles of $SiR^2_r X^2_{3-r}$ in the compound represented by Formula (2) and having the number average molecular weight of 3000 or more]) is 1.5 to 20, and a molar ratio of the compound represented by Formula (1) and the compound represented by Formula (2) and having the number average molecular weight of 3000 or more ([the number of moles of the compound represented by Formula (1)]/[the number of moles of the compound represented by Formula (2) and having the number average molecular weight of 3000 or more]) is 2 to 40, $$R^{f1}\text{-}Q^1\text{-}SiR^1_p X^1_{3-p} \qquad \text{Formula (1):}$$

where, $R^{f1}$ is a group $C_k F_{2k+1}$, where k is an integer of 1 to 8, $Q^1$ is a bivalent hydrocarbon group having 1 to 6 carbon atoms, $R^1$'s are each independently a monovalent hydrocarbon group having 1 to 6 carbon atoms, $X^1$'s are each independently a hydroxyl group or a hydrolyzable group, and p is an integer of 0 to 2, $$[A]_{b1} Q^2 [B]_{b2} \qquad \text{Formula (2):}$$

where, $Q^2$ is a linking group having a valency of (b1+b2),

A is a group represented by $R^{f3}\text{—O—}R^{f2}\text{—}$, where $R^{f2}$ is a poly(oxyfluoroalkylene) chain, and $R^{f3}$ is a perfluoroalkyl group, B is a monovalent group having one —$R^{12}$— $(SiR^2_r X^2_{3-r})$, where $R^{12}$ is a hydrocarbon group having 2 to 10 carbon atoms that optionally has an ether oxygen atom between the carbon-carbon atoms or at an end opposite to a side bonded with Si or optionally has —NH— between the carbon-carbon atoms, $R^2$'s are each independently a hydrogen atom or a monovalent hydrocarbon group having 1 to 6 carbon atoms, the hydrocarbon group optionally containing a substituent, $X^2$'s are each independently a hydroxyl group or a hydrolyzable group, and r is an integer of 0 to 2, and including no fluorine atom, $Q^2$ and B include no cyclic siloxane structure, b1 is an integer of 1 to 3, b2 is an integer of 2 to 9, and in a case where b1 is 2 or more, b1 pieces of A may be identical or different, and b2 pieces of B may be identical or different.

[2] The composition for forming a water repellent film according to [1], wherein $R^{f2}$ in Formula (2) is a group represented by —$(C_a F_{2a} O)_n$— where a is an integer of 1 to 6, n is an integer of 2 or more, and the —$C_a F_{2a} O$— units may be identical or different.

[3] The composition for forming a water repellent film according to [1], wherein $R^{f2}$ in Formula (2) is a group represented by a group —$(CF_2 CF_2 CF_2 CF_2 CF_2 CF_2 O)_{n1}$—$(CF_2 CF_2 CF_2 CF_2 O)_{n2}$—$(CF_2 CF_2 CF_2 O)_{n3}$—$(CF_2 CF_2 O)_{n4}$—$(CF(CF_3)CF_2 O)_{n5}$—$(CF_2 CF_2 O)_{n6}$—

$(CF_2O)_{n7}$— where n1, n2, n3, n4, n5, n6, and n7 are each independently an integer of 0 or more, the sum of n1, n2, n3, n4, n5, n6, and n7 is 2 or more, and the repeating units may exist in block, alternately, or randomly.

[4] A water repellent film formed by using the composition for forming a water repellent film according to [1].

[5] A substrate with a water repellent film including a substrate and the water repellent film according to [4] on at least part of the substrate.

[6] The substrate with a water repellent film according to [5] including a base layer between the substrate and the water repellent film.

[7] The substrate with a water repellent film according to [5], wherein the substrate is glass or sapphire.

[8] An article including the substrate with a water repellent film according to [5].

According to the present invention, it is possible to provide a composition for forming a water repellent film that can form a water repellent film not only excellent in water repellency but also excellent in abrasion resistance, particularly in abrasion resistance evaluated under close-to-actual-use conditions where a light resistance test is combined. Further, according to the present invention, it is possible to provide a water repellent film formed by using the composition for forming a water repellent film, a substrate with a water repellent film including the water repellent film on at least part of a substrate, and an article, such as a transportation equipment window member and window members and lenses of cameras and sensors, including the substrate with a water repellent film.

DETAILED DESCRIPTION

An embodiment of the present invention will be hereinafter described. The present invention should not be construed in a restrictive manner by the description below.

In the present specification, a compound or a group represented by a formula is also described as a compound or a group followed by a number of the formula, and for example, a compound represented by Formula (1) is described also as a compound (1).

[Composition for Forming a Water Repellent Film]

A composition for forming a water repellent film of the present invention contains the compound (1) and a compound represented by Formula (2) and having a number average molecular weight of 3000 or more (hereinafter, also referred to as a "compound (21)"), at the following ratio.

The contents of the compound (1) and the compound (21) are such that a molar ratio of $SiR^1_p X^1_{3-p}$ in the compound (1) and $SiR^2_r X^2_{3-r}$ in the compound (21) ([the number of moles of $SiR^1_p X^1_{3-p}$ in the compound (1)]/[the number of moles of $SiR^2_r X^2_{3-r}$ in the compound (21)]) is 1.5 to 20, and a molar ratio of the compound (1) and the compound (21) ([the number of moles of the compound (1)]/[the number of moles of the compound (21)]) in the composition for forming a water repellent film is 2 to 40.

The composition for forming a water repellent film of the present invention contains, at the aforesaid predetermined quantitative ratio of a hydrolyzable silane compound (the compound (1)) having a perfluoroalkyl group and having no ether bond; and a compound (the compound (21)) having a poly(oxyfluoroalkylene) group and a plurality of hydrolyzable silyl groups with a specific structure, thereby capable of forming a water repellent film not only excellent in water repellency but also in abrasion resistance, particularly in abrasion resistance evaluated under close-to-actual-use conditions where a light resistance test is combined.

In the composition for forming a water repellent film of the present invention, the molar ratio of $SiR^1_p X^1_{3-p}$ in the compound (1) and $SiR^2_r X^2_{3-r}$ in the compound (21) is preferably 1.5 to 10, and more preferably 1.5 to 8. Further, the molar ratio of the contents of the compound (1) and the compound (21) of the composition for forming a water repellent film of the present invention is preferably 3 to 30, and more preferably 4 to 20.

<Compound (1)>

The compound (1) is the hydrolyzable silane compound having the perfluoroalkyl group and represented by Formula (1) below.

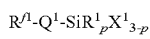

$$R^{f1}\text{-}Q^1\text{-}SiR^1_p X^1_{3-p} \qquad \text{Formula (1):}$$

In Formula (1), $R^{f1}$ is a group $C_k F_{2k+1}$, where k is an integer of 1 to 8, and may be a straight-chain or branched-chain group. Considering an environmental burden, k is preferably an integer of 1 to 6. In view of excellent weather resistance, among all, a straight-chain group $CF_3(CF_2)_{k-1}$, where k is as described above, is preferable, $CF_3(CF_2)_3$—, $CF_3(CF_2)_4$—, or $CF_3(CF_2)_5$— is more preferable, and $CF_3(CF_2)_5$— is particularly preferable.

In Formula (1), $Q^1$ is a bivalent hydrocarbon group having 1 to 6 carbon atoms, and examples thereof include a straight-chain or branched-chain alkylene group and a group having an amide group or an ether oxygen atom between carbon-carbon atoms of a straight-chain or branched-chain alkylene group having 2 to 6 carbon atoms. Among all, a straight-chain alkylene group having 1 to 6 carbon atoms represented by —$(CH_2)_t$—, where t is an integer of 1 to 6, is preferable, —$(CH_2)_2$—, —$(CH_2)_3$—, or —$(CH_2)_4$— is more preferable, and —$(CH_2)_2$— is particularly preferable.

In Formula (1), $R^1$ is a monovalent hydrocarbon group having 1 to 6 carbon atoms, and examples thereof include a straight-chain or branched-chain alkyl group. In view of easy availability, among all, a straight-chain or branched-chain alkyl group having 1 to 4 carbon atoms is preferable, and a methyl group or an ethyl group is more preferable. In a case where the number of $R^1$'s is plural, $R^1$'s may be identical or may be different, and are preferably identical in view of easy availability.

In Formula (1), $X^1$ is a hydroxyl group or a hydrolyzable group. Here, the hydrolyzable group refers to a group that can form Si—OH by a hydrolysis of Si—$X^1$, and examples thereof include an alkoxy group, an acyloxy group, a ketoxime group, an alkenyloxy group, an amino group, an aminooxy group, an amide group, an isocyanato group, and a halogen atom. $X^1$ is preferably a hydroxyl group, an alkoxy group, for example, an alkoxy group having 1 to 4 carbon atoms, an isocyanato group, or a halogen atom, for example, a chlorine atom, more preferably a methoxy group, an ethoxy group, or a chlorine atom, and particularly preferably a methoxy group. In a case where the number of $X^1$'s is plural, $X^1$'s may be identical or may be different, and are preferably identical in view of easy availability.

In a case where $X^1$ is a chlorine atom, owing to its high reactivity, the hydrolysis reaction sufficiently progresses without any acid catalyst being added. In some application, a compound whose $X^1$ is a chlorine atom is preferably used.

In Formula (1), p is an integer of 0 to 2, and in view of excellent adhesiveness and durability, is preferably 0 or 1, and more preferably 0.

Examples of the compound (1) are as follows. Examples and preferably forms of k, t, $X^1$, and $R^1$ are the same as above.

$$CF_3(CF_2)_{k-1}\text{—}(CH_2)_t\text{—}SiX^1{}_3 \quad \text{Formula (1-1):}$$

$$CF_3(CF_2)_{k-1}\text{—}(CH_2)_t\text{—}SiR^1X^1{}_2 \quad \text{Formula (1-2):}$$

As the compound (1), one kind may be used alone or two or more kinds may be used in combination. The compound (1) can be produced by a typical production method and is easily commercially available.

<Compound (21)>

The compound (21) is a compound that is represented by Formula (2) below and has the poly(oxyfluoroalkylene) group and the plurality of hydrolyzable silyl groups with the specific structure, and is a compound having the number average molecular weight of 3000 or more.

$$[A]_{b1}Q^2[B]_{b2} \quad \text{Formula (2):}$$

In Formula (2), A is a group represented by $R^{f3}$—O—$R^{f2}$—. $R^{f3}$ is a perfluoroalkyl group, and its number of carbon atoms is preferably 1 to 20, and more preferably 1 to 6. $R^{f3}$ may be a straight-chain group or may be a branched-chain group. Among all, in view of easy availability, a straight-chain group $CF_3(CF_2)_{m2-1}$, where m2 is 1 to 20, and is preferably 1 to 6, is preferable, $CF_3$— or $CF_3(CF_2)_2$— is more preferable, and $CF_3(CF_2)_2$ is particularly preferable.

In Formula (2), $R^{f2}$ is a poly(oxyfluoroalkylene) chain. $R^{f2}$ is, for example, —$(C_aF_{2a}O)_n$—, where a is an integer of 1 to 6, n is an integer of 2 or more, and the —$C_aF_{2a}O$— units may be identical or may be different. The —$C_aF_{2a}O$— units each may be a straight-chain one or a branched-chain one. Examples thereof include —$CF_2CF_2CF_2CF_2CF_2CF_2O$—, —$CF_2CF_2CF_2CF_2CF_2O$—, —$CF_2CF_2CF_2CF_2O$—, —$CF_2CF_2CF_2O$—, —$CF(CF_3)CF_2O$—, —$CF_2CF_2O$—, and $CF_2O$. n can be appropriately adjusted according to a desired number average molecular weight. A preferable upper limit value of n is 200.

$R^{f2}$ may be a combination of a plurality of units, and in this case, the units may exist in block, alternately, or randomly. For example, —$CF_2CF_2CF_2CF_2CF_2CF_2O$, —$CF_2CF_2CF_2CF_2CF_2O$—, and —$CF_2CF_2CF_2CF_2O$— are preferably included because they achieve excellent light resistance, and the larger an abundance ratio of these structures, the more preferable, and in view of easy synthesis, it is more preferably —$CF_2CF_2O$—$CF_2CF_2CF_2CF_2O$— which is a unit in which —$CF_2CF_2CF_2CF_2O$— and —$CF_2CF_2O$— are combined.

Specific examples of $R^{f2}$ include —$(CF_2CF_2CF_2CF_2CF_2CF_2O)_{n1}$—$(CF_2CF_2CF_2CF_2CF_2O)_{n2}$—$(CF_2CF_2CF_2CF_2O)_{n3}$—$(CF_2CF_2CF_2O)_{n4}$—$(CF(CF_3)CF_2O)_{n5}$—$(CF_2CF_2O)_{n6}$—$(CF_2O)_{n7}$—, where n1, n2, n3, n4, n5, n6, and n7 are each independently an integer of 0 or more, and the sum of n1, n2, n3, n4, n5, n6, and n7 is 2 or more, and the repeating units may exist in block, alternately, or randomly.

$R^{f2}$ is preferably $\{(CF_2O)_{n11}(CF_2CF_2O)_{n12}\}$, $(CF_2CF_2O)_{n13}$, $(CF_2CF_2CF_2O)_{n14}$, or $(CF_2CF_2O$—$CF_2CF_2CF_2CF_2O)_{n15}$, and more preferably $\{(CF_2O)_{n11}(CF_2CF_2O)_{n12}\}$ or $(CF_2CF_2CF_2O)_{n14}$. In the formula, n11 is an integer of 1 or more, n12 is an integer of 1 or more, n11+n12 is an integer of 2 to 200, and a bonding order of n11 pieces of $CF_2O$ and n12 pieces of $CF_2CF_2O$ is not limited. n13 and n14 are each an integer of 2 to 200 and n15 is an integer of 1 to 100.

In Formula (2), the number (b1) of the groups A represented by $R^{f3}$—O—$R^{f2}$— is an integer of 1 to 3. In Formula (2), in a case where the number of the groups A is plural, the groups A may be identical or may be different. The group A and the perfluoroalkyl groups in the compound (1) are groups contributing to water repellency of an obtained water repellent film. In a case where the compound (21) has the plurality of groups A, the density of the $R^{f3}$—O—$R^{f2}$— group is high, which is preferable because a surface layer comes to have excellent abrasion resistance.

In Formula (2), the group B is a monovalent group having one —$R^{12}$—$(SiR^2{}_rX^2{}_{3-r})$ (hereinafter, also referred to as a "group (Bt)") at its end and including no cyclic siloxane structure and fluorine atom.

The group B is specifically a group represented by —Y—$R^{12}$—$(SiR^2{}_rX^2{}_{3-r})$. The group (Bt) and $Q^2$ are linked by —Y—. Y is a single bond or a bivalent organic group including no cyclic siloxane structure and fluorine atom. For example, Y is an alkylene group including, at its end, an arylene group having 6 to 8 carbon atoms such as a phenylene group, for example, an alkylene-arylene group having 8 to 16 carbon atoms, or is a bivalent group in which an alkylene group, for example, having 1 to 20 carbon atoms, is bonded with a silalkylene structure, for example, having 1 to 10 carbon atoms and 2 to 10 Si atoms, or a silarylene structure, for example, having 1 to 10 carbon atoms and 2 to 10 Si atoms, and its end on the group (Bt) side is a group except the alkylene group. An atom of $Q^2$ bonded with Y is an atom forming a main chain, and specific examples thereof include Si, C, and N. Y is preferably a single bond.

$R^{12}$ is a hydrocarbon group having 2 to 10 carbon atoms that may have an ether oxygen atom between carbon-carbon atoms or at an end opposite to a side bonded with Si, or that may have —NH— between the carbon-carbon atoms. Specifically, it is preferably a group(the right side is bonded with Si) selected from a group consisting of —$CH_2CH_2$—, —$CH_2CH_2CH_2$—, —$CH_2OCH_2CH_2CH_2$—, and —$OCH_2CH_2CH_2$—, and in view of excellent light resistance of the water repellent film, is particularly preferably —$CH_2CH_2$— or —$CH_2CH_2CH_2$-having no ether oxygen atom. All of $R^{12}$'s of the plurality of groups B in Formula (2) may be identical groups or need not be identical groups.

$X^2$ is a hydroxyl group or a hydrolyzable group, and examples and preferable forms of the hydrolyzable group are the same as those of the hydrolyzable group in $X^1$. r is an integer of 0 to 2, and in view of excellent adhesiveness and durability, is preferably 0 or 1, and more preferably 0. In a case where the number of $X^2$'s is plural, $X^2$'s may be identical or may be different, and in view of easy availability, are preferably identical.

$R^2$ is a hydrogen atom or a monovalent hydrocarbon group having 1 to 6 carbon atoms, and the hydrocarbon group may contain a substituent. An example of the hydrocarbon group is a straight-chain or branched-chain alkyl group. Among all, in view of easy availability, a straight-chain or branched-chain alkyl group having 1 to 4 carbon atoms is preferable, and a methyl group or an ethyl group is more preferable. An example of the substituent is a halogen atom, for example, a chlorine atom. r which is the number of $R^2$'s bonded with Si is an integer of 0 to 2. In a case where the number of $R^2$'s is plural, $R^2$'s may be identical or may be different, and in view of easy availability, are preferably identical.

In Formula (2), the number of the groups B represented by b2 is an integer of 2 to 9. Therefore, the number of the groups (Bt) in the compound (21) is 2 to 9. The group (Bt) is a group contributing to light and abrasion resistance of the obtained water repellent film. The number of the groups B in the compound (21), that is, the number of the groups (Bt)

is preferably 2 to 4 because this makes the obtained water repellent film have excellent light and abrasion resistance.

Incidentally, the plurality of groups B that the compound (21) has may be identical or may be different. The groups (Bt) may also be identical or may be different.

In Formula (2), $Q^2$ is a linking group whose valency is (b1+b2). $Q^2$ is, for example, a hydrocarbon group, and may have, at its end or between carbon atom-carbon atom, an ester bond, an ether bond, an amide bond, an urethane bond, a phenylene group, —S—, a bivalent amino group, a silalkylene structure, a silarylene structure, or a siloxane structure (exclusive of a cyclic siloxane structure), and a hydrogen atom of the hydrocarbon group may be replaced by a fluorine atom. The hydrogen atom of the hydrocarbon group may be replaced by a hydroyl group, and the number of the substituting hydroxyl groups is preferably 1 to 5. The hydrocarbon group may be straight-chained or may be branched. The number of the carbon atoms in $Q^2$ is preferably 1 to 20, and more preferably 1 to 10.

Incidentally, the group A and the group B may be bonded with the same atom in $Q^2$, and are preferably bonded with different atoms, and the atoms with which they are bonded are more preferably apart from each other as much as possible in a molecule.

Further, $Q^2$ may have $-SiR^0_{r1}X^4_{3-r1}$, where $R^0$, $X^4$, and r1 are the same as $R^2$, $X^2$, and r of the group (Bt) respectively, directly bonded with an atom other than that at the end of the chain, and preferably, the compound (21) does not have a hydrolyzable silyl group other than the group (Bt). Incidentally, in a case where the compound (21) has $-SiR^0_{r1}X^4_{3-r1}$ directly bonded with the atom other than that at the end of the chain, this $-SiR^0_{r1}X^4_{3-r1}$ is counted out from $SiR^2_rX^2_{3-r}$ when the molar ratio of $-SiR^1_pX^1_{3-p}$ of the compound (1) and $SiR^2_rX^2_{3-r}$ of the compound (21) is calculated.

The number average molecular weight of the compound (21) is 3000 or more, and in view of excellent abrasion resistance and chemical resistance, is preferably 3500 to 20000, and more preferably 4000 to 15000. Here, the number average molecular weight is calculated by finding the number (average value) of oxyperfluoroalkylene units based on a terminal group, using an NMR analysis method.

Examples of the compound (21) include the following compounds (21-1) to (21-5). A preferable number average molecular weight in the compounds (21-1) to (21-5) is the same as that in the compound (21).

(Compound (21-1))

The compound (21-1) is a compound represented by Formula (2-1) below and having a number average molecular weight of 3000 or more.

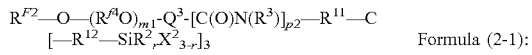

$$R^{F2}\text{—O—}(R^{f4}O)_{m1}\text{-}Q^3\text{-}[C(O)N(R^3)]_{p2}\text{—}R^{11}\text{—}C[\text{—}R^{12}\text{—}SiR^2_rX^2_{3-r}]_3 \quad \text{Formula (2-1):}$$

In Formula (2-1), $R^{F2}$—O—$(R^{f4}O)_{m1}$— corresponds to the group A in Formula (2), -$Q^3$-[C(O)N($R^3$)]$_{p2}$—$R^{11}$—C corresponds to $Q^2$ in Formula (2), and —$R^{12}$—$SiR^2_rX^2_{3-r}$ corresponds to the group B in Formula (2). The compound represented by Formula (2-1) is a compound having one group A at one end and having three groups B at the other end.

Note that the signs in Formula (2-1) represent as follows.

$R^{F2}$ is a perfluoroalkyl group having 1 to 20 carbon atoms;
$R^{f4}$ is a fluoroalkylene group having no branched structure;
m1 is an integer of 2 to 200;
$(R^{f4}O)_{m1}$ may be composed of two or more kinds of $R^{f4}$O different in the number of carbon atoms;

$Q^3$ is a fluoroalkylene group having no branched structure;
$R^3$ is a hydrogen atom or an alkyl group;
p2 is 0 or 1;
$R^{11}$ is a single bond, an alkylene group, a group having an ether oxygen atom at an end (an end on a side bonded with $C[-R^{12}-SiR^2_rX^2_{3-r}]_3$) of an alkylene group, a group having an ether oxygen atom between carbon-carbon atoms of an alkylene group having 2 or more carbon atoms, or a group having ether oxygen atoms at an end (an end on a side bonded with $C[-R^{12}-SiR^2_rX^2_{3-r}]_3$) and between carbon-carbon atoms of an alkylene group having 2 or more carbon atoms; and $R^{12}$ is a hydrocarbon group with 2 to 10 carbon atoms that may have an ether oxygen atom between carbon-carbon atoms or at an end opposite to a side bonded with Si, out of the groups represented by $R^{12}$ of Formula (2) above;
$R^2$ and r are the same as those in Formula (2);
$X^2$ is a hydrolyzable group out of the groups represented by $X^2$ in Formula (2); and
three [—$R^{12}$—$SiR^2_rX^2_{3-r}$] may be identical or may be different.

A preferable form of $R^{F2}$—O—$(R^{f4}O)_{m1}$— in Formula (2-1) is the same as the preferable form of the group A in Formula (2). Further, a preferable form of —$R^{12}$—$SiR^2_rX^2_{3-r}$ in Formula (2-1) is the same as the preferable form of —$R^{12}$—$SiR^2_rX^2_{3-r}$ in Formula (2).

$Q^3$ may be a perfluoroalkylene group having no branched structure, or may be a fluoroalkylene group including one or more hydrogen atoms and having no branched structure. The number of carbon atoms in $Q^3$ is preferably 1 to 20, and more preferably 1 to 10. With the compound (21-1) whose $Q^3$ has no branched structure, it is possible to form a surface layer excellent in abrasion resistance and lubricity.

$Q^3$ is a fluoroalkylene group derived from $R^{f4}$, or a fluoroalkylene group derived from a compound having an amide group and a hydrolyzable silyl group, which is used when the compound (21-1) is produced.

In a case where p2 is 0, $Q^3$ is a fluoroalkylene group including two or more hydrogen atoms and having no branched structure and $R^{11}$ has no ether oxygen atom at the end on the side bonded with $Q^3$, at least one fluorine atom is bonded with the carbon atom at the end of $Q^3$ on a side bonded with $R^{11}$.

$R^3$ in the [C(O)N($R^3$)]$_{p2}$ group is preferably a hydrogen atom in view of easy production of the compound (21-1). In a case where $R^3$ is an alkyl group, the alkyl group is preferably an alkyl group having 1 to 4 carbon atoms.

In the case where p2 is 0, $R^{11}$ is preferably a group (the left side is bonded with $Q^3$) selected from a group consisting of a single bond, —CH$_2$O—, —CH$_2$OCH$_2$—, —CH$_2$OCH$_2$CH$_2$O—, and —CH$_2$OCH$_2$CH$_2$OCH$_2$— in view of the easy production of the compound (21-1). In a case where p2 is 1, $R^{11}$ is preferably a group selected from a group consisting of a single bond, —CH$_2$—, and —CH$_2$CH$_2$— in view of the easy production of the compound (21-1).

Further, a preferable form of the compound (21-1) is, for example, a compound represented by Formula (2-1a) and having a number average molecular weight of 3000 or more (also referred to as a compound (21-1a)).

$$R^{F2}\text{—O-}Q^{11}\text{-}(R^{f1}O)_{m10}\text{-}Q^{12}\text{-}[C(O)N(R^3)]_{p2}\text{—}R^{11}\text{—}C[\text{—}R^{12}\text{—}SiR^2_rX^2_{3-r}]_3 \quad \text{Formula (2-1a):}$$

Where, $R^{F2}$, $R^3$, p2, $R^{11}$, $R^{12}$, $R^2$, $X^2$, and r are the same as those in Formula (2-1);

$Q^{11}$ is a single bond, a fluoroalkylene group having 1 to 20 carbon atoms, including one or more hydrogen atoms and having no branched structure, a group having an ether oxygen atom at an end (except an end on a side bonded with $RF^2$—O) of a fluoroalkylene group having 1 to 20 carbon atoms, including one or more hydrogen atoms and having no branched structure, a group having an ether oxygen atom between carbon-carbon atoms of a fluoroalkylene group having 2 to 20 carbon atoms, including one or more hydrogen atoms and having no branched structure, or a group having an ether oxygen atom at an end (except an end on a side bonded with $RF^2$—O) and between carbon-carbon atoms of a fluoroalkylene group having 2 to 20 carbon atoms, including one or more hydrogen atoms and having no branched structure, where the number of oxygens is 10 or less;

$R^{F1}$ is a perfluoroalkylene group having 1 to 6 carbon atoms and no branched structure;

m10 is an integer of 2 to 200:

$(R^{F1}O)_{m10}$ may be composed of two or more kinds of $R^{F1}O$ different in the number of carbon atoms; and $Q^{12}$ is a perfluoroalkylene group having no branched structure, a fluoroalkylene group including one or more hydrogen atoms and having no branched structure, or a group having an ether oxygen atom between carbon-carbon atoms of a fluoroalkylene group having 2 or more carbon atoms, including one or more hydrogen atoms and having no branched structure.

A preferable form of $R^{F2}$—O-$Q^{11}$-$(R^{F1}O)_{m10}$— in Formula (2-1a) is the same as the preferable form of the group A in Formula (2). Further, a preferable form of —$R^{12}$—$SiR^2_rX^2_{3-r}$ in Formula (2-1a) is the same as the preferable form of —$R^{12}$—$SiR^2_rX^2_{3-r}$ in Formula (2).

In the case where p2 is 0, for example, in a case where $(R^{F1}O)_{m10}$ is $\{(CF_2O)_{n11}(CF_2CF_2O)_{n12}\}$ or $(CF_2CF_2O)_{n13}$, $Q^{12}$ is a perfluoroalkylene group having one carbon atom, in a case where $(R^{F1}O)_{m10}$ is $(CF_2CF_2CF_2O)_{n14}$, $Q^{12}$ is perfluoroalkylene group having 2 carbon atoms, and in a case where $(R^{F1}O)_{m10}$ is $(CF_2CF_2O—CF_2CF_2CF_2CF_2O)_{n15}$, $Q^{12}$ is a straight-chain perfluoroalkylene group having 3 carbon atoms.

A preferable form of —$[C(O)N(R^3)]_{p2}$—$R^{11}$— is the same as the preferable form of —$[C(O)N(R^3)]_{p2}$—$R^{11}$— in Formula (2-1).

Specific examples of the compound represented by Formula (2-1a) are shown below. In the following formulas, PFPE represents $R^{F2}$—O-$Q^{11}$-$(R^{F1}O)_{m10}$-$Q^{12}$-. A preferable form of PFPE is a combination of the preferable $R^{F2}$, $Q^{11}$, $(R^{F1}O)_{m10}$, and $Q_{12}$ described above. An example of the compound (21-1a) is a compound whose PFPE is adjusted such that the number average molecular weight becomes 3000 or more in the following compounds.

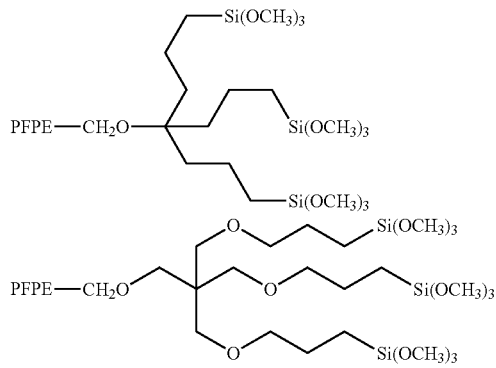

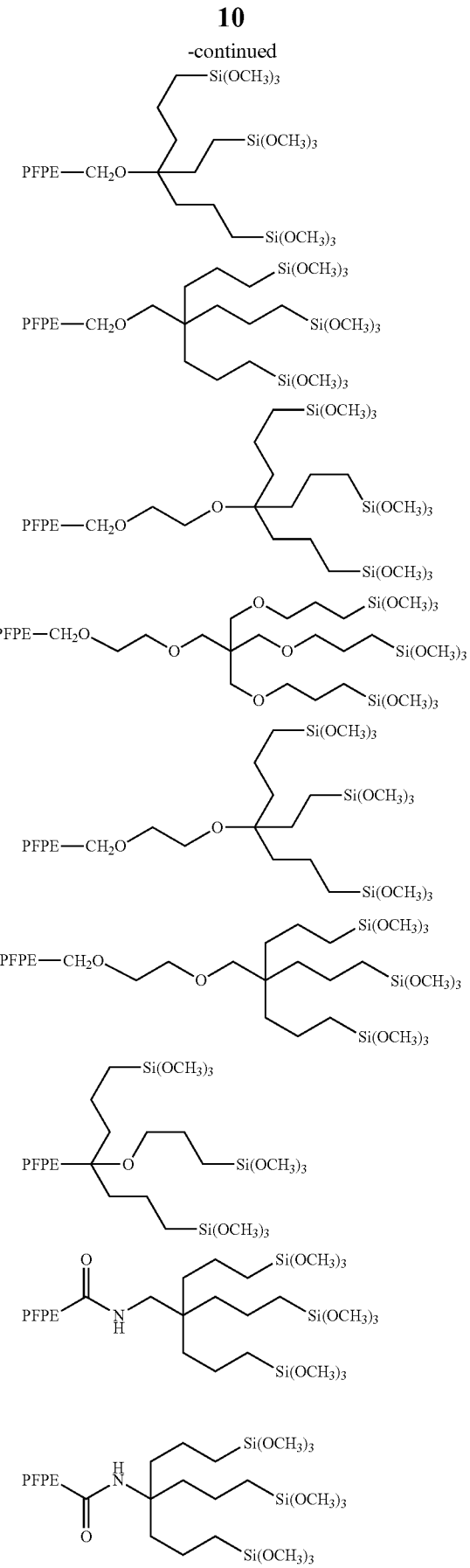

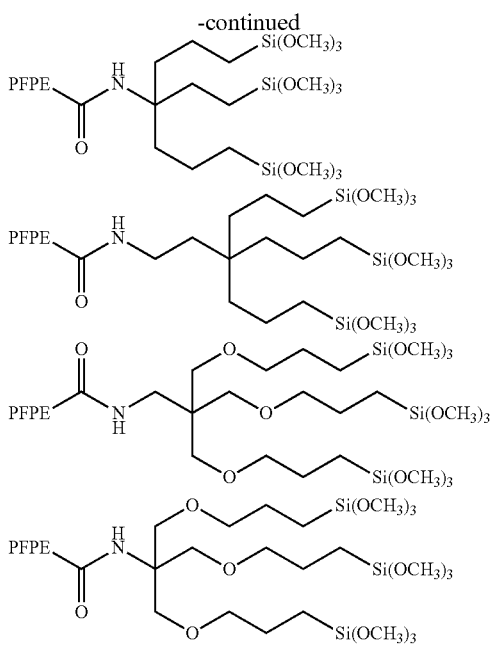

(Compound (21-2))

The compound (21-2) is a compound represented by Formula (2-2) below and having a number average molecular weight of 3000 or more.

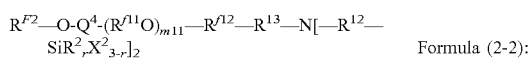  Formula (2-2):

In Formula (2-2), $R^{F2}$—O-$Q^4$-($R^{f11}$O)$]_{m11}$— corresponds to the group A in Formula (2), —$R^{f12}$—$R^{13}$—N corresponds to $Q^2$ in Formula (2), and —$R^{12}$—$SiR^2_rX^2_{3-r}$ corresponds to the group B in Formula (2). The compound represented by Formula (2-2) is a compound having one A at one end and having two B's at the other end.

The signs in Formula (2-2) represent as follows.

$R^{F2}$ is the same as that in the aforesaid Formula (2-1), $Q^4$ is a single bond, a fluoroalkylene group having 1 to 20 carbon atoms and including one or more hydrogen atoms, a group having an ether oxygen atom at an end (except an end on a side bonded with $R^{F2}$—O) of a fluoroalkylene group having 1 to 20 carbon atoms and including one or more hydrogen atoms, a group having an ether oxygen atom between carbon-carbon atoms of a fluoroalkylene group having 2 to 20 carbon atoms and including one or more hydrogen atoms, or a group having an ether oxygen atom at an end (except an end on a side bonded with $R^{F2}$—O) and between carbon-carbon atoms of a fluoroalkylene group having 2 to 20 carbon atoms and including one or more hydrogen atoms, $R^{f11}$ and $R^{f12}$ are each independently a perfluoroalkylene group, m11 is an integer of 2 to 200, and ($R^{f11}$O)$_{m11}$ may be composed of two or more kinds of $R^{f11}$O different in the number of carbon atoms, $R^{13}$ is a single bond, an alkylene group, a group having an ether oxygen atom or NH— at an end (except an end on a side bonded with N) of an alkylene group, a group having an ether oxygen atom or NH— between carbon-carbon atoms of an alkylene group having 2 or more carbon atoms, or a group having an ether oxygen atom or NH— at an end (except an end on a side bonded with N) and between carbon-carbon atoms of an alkylene group having 2 or more carbon atoms, and the number of the carbon atoms is preferably 0 to 20, and more preferably 0 to 10, $R^{12}$ is a hydrocarbon group having 2 to 10 carbon atoms that may have an ether oxygen atom or NH—, out of the groups represented by $R^{12}$ of Formula (2) above;

$R^2$ and r are the same as those in Formula (2) above;

$X^2$ is a hydrolyzable group out of the groups represented by $X^2$ in Formula (2) above; and two [—$R^{12}SiR^2_rX^2_{3-r}$] may be identical or may be different.

A preferable form of $R^{F2}$—O-$Q^4$-($R^{f11}$O)$_{m11}$— in Formula (2-2) is the same as the preferable form of the group A in Formula (2). Further, a preferable form of —$R^{12}$—$SiR^2_rX^2_{3-r}$ in Formula (2-2) is the same as the preferable form of —$R^{12}SiR^2_rX^2_{3-r}$ in Formula (2).

In a case where, for example, ($R^{f11}$O)$_{m11}$ is {(CF$_2$O)$_{n11}$(CF$_2$CF$_2$O)$_{n12}$} or (CF$_2$CF$_2$O)$_{n13}$, $R^{f12}$ is a perfluoroalkylene group having one carbon atom, in a case where ($R^{f11}$O)$_{m11}$ is (CF$_2$CF$_2$CF$_2$O)$_{n14}$, $R^{f12}$ is a perfluoroalkylene group having 2 carbon atoms, and in a case where ($R^{f11}$O)$_{m11}$ is (CF$_2$CF$_2$O—CF$_2$CF$_2$CF$_2$CF$_2$O)$_{n15}$, $R^{f12}$ is a straight-chain perfluoroalkylene group having 3 carbon atoms. If $R^{f12}$ is a perfluoroalkylene group having no branched structure, the water repellent film is excellent in abrasion resistance and lubricity.

$R^{13}$ is preferably a group (the left side is bonded with $R^{f12}$) selected from a group consisting of —CH$_2$—, —CH$_2$CH$_2$—, —CH$_2$CH$_2$CH$_2$—, —CH$_2$OCH$_2$CH$_2$—, and —CH$_2$NHCH$_2$CH$_2$— in view of the easy production of the compound (2-2).

Specific examples of the compound represented by Formula (2-2) are shown below. In the following formulas, PFPE represents $R^{F2}$—O-$Q^4$-($R^{f11}$O)$_{m11}$—$R^{f12}$—. A preferable form of PFPE is a combination of the aforesaid preferable $R^{F2}$, $Q^4$, ($R^{f11}$O)$_{m11}$, and $R^{f12}$. An example of the compound (21-2) is a compound whose PFPE is adjusted such that the number average molecular weight becomes 3000 or more in the following compounds.

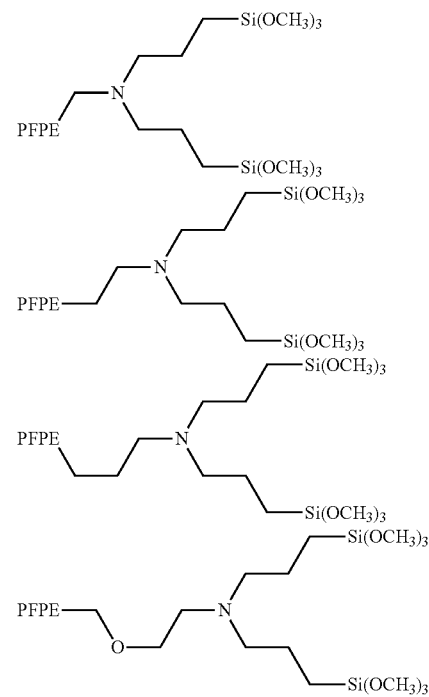

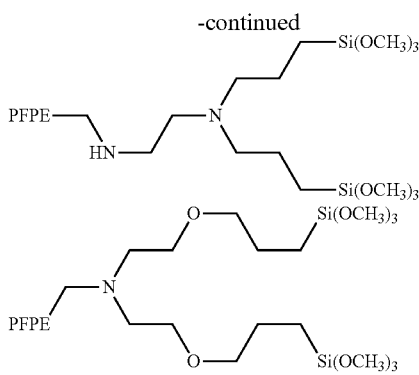

(Compound (21-3))

The compound (21-3) is a compound represented by Formula (2-3) below and having a number average molecular weight of 3000 or more.

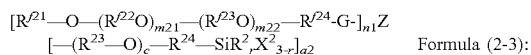

Formula (2-3):

In Formula (2-3), $[R'^{21}—O—(R'^{22}O)]_{m21}—(R'^{23}O)_{m22}—$ corresponds to the group A in Formula (2), $—(R^{23}—O)_c—R^{24}—SiR^2{}_rX^2{}_{3-r}$ corresponds to the group B in Formula (2), and the residue including Z corresponds to $Q^2$ in Formula (2). The compound represented by Formula (2-3) is a compound that has, at one end, a1 pieces of monovalent groups each having the group A and has a2 pieces of the groups B at the other end.

The signs in Formula (2-3) represent as follows.

When m21 is 0, $R'^{21}$ is a straight-chain perfluoroalkyl group having 1 to 20 carbon atoms, and when m21 is 1 or more, it is a straight-chain perfluoroalkyl group having 1 to 20 carbon atoms or a straight-chain group having 2 to 20 carbon atoms that has one or more ether oxygen atoms between carbon atom-carbon atom of a perfluoroalkyl group;

$R'^{22}$ is a straight-chain fluoroalkylene group having 1 to 10 carbon atoms that has one or more hydrogen atoms;

m21 is an integer of 0 to 10, and when m21 is 2 or more, $(R'^{22}O)_{m21}$ may be composed of two or more kinds of $R'^{22}O$ which are different in the number of carbon atoms and/or the number of hydrogen atoms;

$R'^{23}$ is a straight-chain perfluoroalkylene group having 1 to 10 carbon atoms;

m22 is an integer of 2 to 200, and $(R'^{23}O)_{m22}$ may be composed of two or more kinds of $R'^{23}O$ different in the number of carbon atoms;

$R'^{24}$ is a straight-chain perfluoroalkylene group having 1 to 10 carbon atoms;

G is $—R^{21}—O—R^{22}—$, $—R^{21}—CONH—R^{22}—$, $—CONH—R^{22}—$, or a single bond;

$R^{21}$ and $R^{22}$ are alkylene groups;

c is 0 or 1,

Z is a hydrocarbon group whose valency is (a1+a2) or a group that has one or more ether oxygen atoms between carbon atom-carbon atom of a hydrocarbon group, has 2 or more carbon atoms, and whose valency is (a1+a2), and the number of the carbon atoms is preferably 2 to 20;

$R^{23}$ and $R^{24}$ are alkylene groups, and the total number of their carbon atoms is 2 to 10;

$R^2$ and r are the same as those in Formula (2) above;

$X^2$ is a hydrolyzable group out of the groups exemplified as $X^2$ of Formula (2) above;

a1 is an integer of 1 to 3, a2 is an integer of 2 to 9 and is preferably 2 to 4, when a1 is 1, a2 is 4 or more, and when a1 is 2 or more, a2 is 2 or more; and when a1 is 2 or more, a1 pieces of $[R'^{21}—O—(R'^{22}O)_{m21}—(R'^{23}O)_{m22}—R'^{24}-G-]$ may be identical or may be different; and a2 pieces of $[—(R^{23}—O)_c—R^{24}—SiR^2{}_rX^2{}_{3-r}]$ may be identical or may be different.

A preferable form of $R'^{21}—O—(R'^{22}O)_{m21}—(R'^{23}O)_{m22}—$ in Formula (2-3) is the same as the preferable form of the group A in Formula (2). Further, a preferable form of $—(R^{23}—O)_c—R^{24}—SiR^2{}_rX^2{}_{3-r}$ in Formula (2-3) is the same as the preferable form of $—R^{12}—SiR^2{}_rX^2{}_{3-r}$ in Formula (2).

In a case where, for example, $(R'^{23}O)_{m22}$ is $\{(CF_2O)_{n11}(CF_2CF_2O)_{n12}\}$ or $(CF_2CF_2O)_{n13}$, $R'^{24}$ is $—CF_2—$, in a case where $(R'^{23}O)_{m22}$ is $(CF_2CF_2CF_2O)_{n14}$, $R'^{24}$ is $—CF_2CF_2—$, and in a case where $(R'^{23}O)_{m22}$ is $(CF_2CF_2O—CF_2CF_2CF_2CF_2O)_{n15}$, $R'^{24}$ is $—CF_2CF_2CF_2—$.

In a case where G is $—R^{21}—O—R^{22}—$ or $—R^{21}—CONH—R^{22}—$, the total number of carbon atoms of $R^{21}$ and $R^{22}$ is 2 to 10. $—R^{21}—O—R^{22}—$ is preferably $—CH_2—O—CH_2—$. In a case where G is $—CONH—R^{22}—$, the number of carbon atoms of $R^{22}$ is 1 to 10, and is preferably 1.

Specific examples of the compound represented by Formula (2-3) are shown below. PFPE in the following formulas represents $R'^{21}—O—(R'^{22}O)_{m21}—(R'^{23}O)_{m22}—R'^{24}—$. A preferable form of PFPE is a combination of the preferable $R'^{21}—O—(R'^{22}O)_{m21}—(R'^{23}O)_{m22}—$ and $R'^{24}$ described above. An example of the compound (21-3) is a compound whose PFPE is adjusted such that a number average molecular weight becomes 3000 or more in the following compounds.

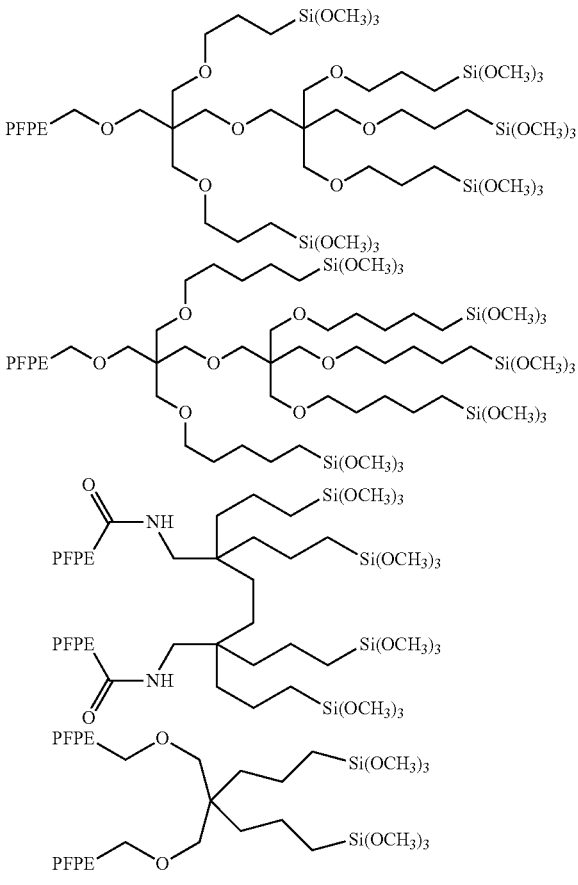

(Compound (21-4))
The compound (21-4) is a compound represented by Formula (2-4) below and having a number average molecular weight of 3000 or more.

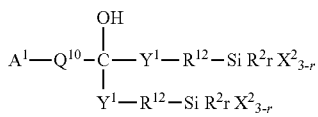
Formula (2-4)

In Formula (2-4), $A^1$ corresponds to the group A in Formula (2), $-Q^{10}-C(OH)<$, corresponds to $Q^2$ in Formula (2), and $-Y^1-R^{12}SiR^2_rX^2_{3-r}$ corresponds to the group B in Formula (2). The compound represented by Formula (2-4) is a compound having one group A at one end and having two groups B at the other end.

In Formula (2-4), $A^1$ is the same as the group A in Formula (2), and $Q^{10}$ is the same as $Q^3$ in the aforesaid Formula (2-1). $-Y^1-R^{12}-(SiR^2_rX^2_{3-r})$ is the same as the group B in Formula (2). Two pieces of $-Y^1-R^{12}-(SiR^2_rX^2_{3-r})$ may be identical or may be different.

Specific examples of $Y^1$ include a single bond, $-(CH_2)_3-Si(CH_3)_2-Ph-Si(CH_3)_2-$ and $-(CH_2)_3-Si(CH_3)_2-O-Si(CH_3)_2-$.

Specific examples of the compound (21-4) are as follows.

(Compound (21-5))
The compound (21-5) is a compound represented by Formula (2-5) below and having a number average molecular weight of 3000 or more.

$$A-Q^5-SiQ^6_{k1}Y^2_{3-k1}$$ Formula (2-5):

In Formula (2-5), A is the same as the group A in Formula (2), $Q^5$ represents a bivalent organic group, $Y^2$'s each dependently represent a hydroxyl group, a hydrolyzable group, or a hydrocarbon group, excluding a case where $Y^2$'s are all hydrocarbon groups, $Q^6$'s each independently represent $-R^{12}-SiX^2_{n21}Q^7_{3-n21}$, $R^{12}$'s are each independently the same as $R^{12}$ in Formula (2), $X^2$'s are each independently the same as $X^2$ in Formula (2), $Q^7$'s each independently represent a hydrogen atom, a monovalent hydrocarbon group having 1 to 6 carbon atoms, or $Q^8$, $Q^8$ is the same as $Q^6$, n21's in $Q^6$ and $Q^8$ are each independently an integer selected from 0 to 3, and the sum of n21's is 1 or more, in $Q^6$, the number of Si's linearly linked via the $R^{12}$ group is 5 at the maximum, and

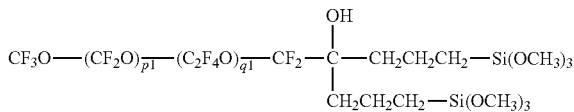

p1 = p-1, q1 = q-1
p1:q1 = 47:53, p1 + q1 ≈ 43

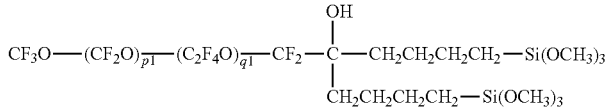

p1 = p-1, q1 = q-1
p1:q1 = 47:53, p1 + q1 ≈ 43

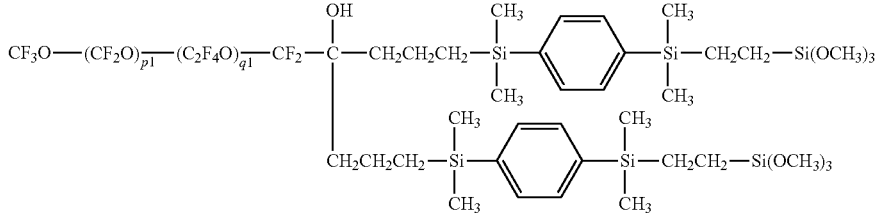

p1 = p-1, q1 = q-1
p1:q1 = 47:53, p1 + q1 ≈ 43

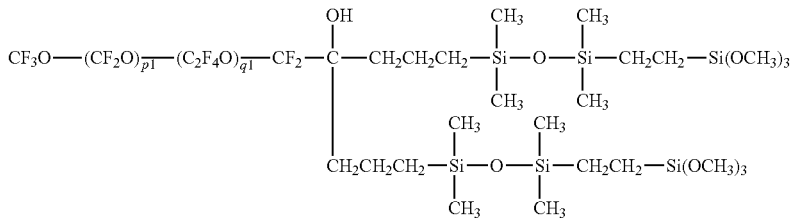

p1 = p-1, q1 = q-1
p1:q1 = 47:53, p1 + q1 ≈ 43 k1's are each independently an integer selected from 1 to 3.

Note that, in Formula (2-5), the number of the groups corresponding to the group B of the compound (2) is 2 to 9.

In Formula (2-5), $Q^5$ is preferably a bivalent organic group represented by $-R^{f6}-(R^6)_{p3}-(Q^9)_{q3}-R^7-$.

$R^{16}$ is a straight-chain perfluoroalkylene group having 1 to 10 carbon atoms, $R^6$ represents $(CH_2)_{s1}$ or a phenylene group, $R^7$ represents $(CH_2)_{t1}$ or a phenylene group, $Q^9$'s are each independently a group in which one to ten selected from $-O-$, $-S-$, a phenylene group, $-C(O)O-$, $-CONR^8-$, $-O-CONR^8-$, $-NR^8-$ ($R^8$'s each independently represent a hydrogen atom, a phenyl group, or an alkyl group having 1 to 6 carbon atoms), $-Si(R^9)_2-$, $-(Si(R^9)_2O)_{t2}-Si(R^9)_2-$ ($R^9$'s are each independently a phenyl group or an alkyl group having 1 to 6 carbon atoms), and $(CH_2)_{t3}-$ are linked, t2's are each independently an integer of 1 to 100, t3's are each independently an integer of 1 to 20, s1 is an integer of 1 to 20, t1 is an integer of 1 to 20, p3 is 0 or 1, and q3 is 0 or 1.

Preferable examples of the compound represented by Formula (2-5) include compounds represented by the following formulas. In the formulas, the signs except the signs $R^2$ and r are the same as those in Formula (2-5), and $R^2$ and r are the same as $R^2$ and r in Formula (2).

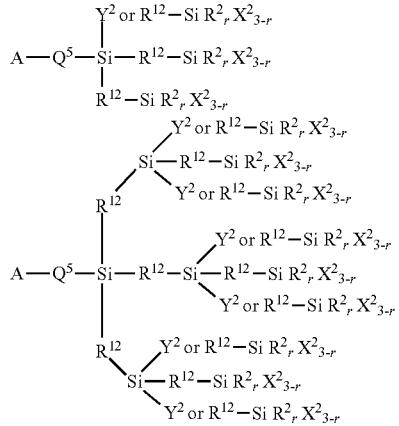

Specific examples of the compound (21-5) out of the compounds represented by the above formulas are as follows.

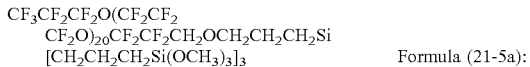
Formula (21-5a):

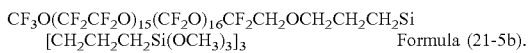
Formula (21-5b).

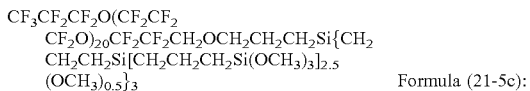
Formula (21-5c):

In the compound (21-5c), $[CH_2CH_2CH_2Si(OCH_3)_3]_{2.5}(OCH_3)_{0.5}$ means that 2.5 and 0.5 pieces of $[CH_2CH_2CH_2Si(OCH_3)_3]$ and $(OCH_3)$ exist on average.

The compound (2) can be synthesized as follows, for instance. As a raw material, a compound having $CF_2=CF-$ O— and a carboxy group or a group convertable to a carboxy group at both ends of a perfluoroalkylene group respectively are prepared, and this compound is polymerized in the presence of alcohol or a fluorine-containing alcohol to form a compound including perfluorinated oxyalkylene units as repeating units. Next, this is fluorinated, and then is made to react with lower alcohol, and after a plurality of ethylenic unsaturated bonds are further introduced to its molecular ends, a hydrolyzable group-containing silane compound having a reactive group is made to react therewith, whereby the compound (2) can be obtained.

Another method to obtain the compound (2) is, for example, to introduce ethylenic unsaturated bonds in number corresponding to the number of the introduced groups B, to polyhydric alcohol having a predetermined number (the total number of the introduced groups A and groups B) of OH groups, thereafter introduce the groups A using the remaining OH groups, and make a hydrolyzable group-containing silane compound having a reactive group react with the ethylenic unsaturated bonds.

As the compound (21), a commercially available product is also usable. Examples of the commercially available product include X71-195 (manufactured by Shin-Etsu Chemical Co., Ltd.), UF503 (manufactured by DAIKIN INDUSTRIES, LTD.), and UD509 (manufactured by DAIKIN INDUSTRIES, LTD.).

The composition for forming a water repellent film of the present invention contains the compound (1) and the compound (21) at the aforesaid predetermined quantitative ratio. The compound (1) and the compound (2) each may form a partially hydrolyzed condensate in the composition for forming a water repellent film within a range not affecting workability when the water repellent film is formed, and partially hydrolyzed co-condensates of the both may be formed. A composition in which the compound (1) and the compound (21) of the composition for forming a water repellent film containing the compound (1) and the compound (21) at the predetermined quantitative ratio are thus moderately partially hydrolyzed and (co)-condensed also falls within the scope of the water repellent film of the present invention.

<Solvent>

The composition for forming a water repellent film of the present invention can contain a solvent in view of workability, easy control of the thickness of the water repellent film, and so on, and the solvent is preferably an organic solvent. As the organic solvent, one that dissolves the essential components can be used, and examples thereof include alcohols, ethers, ketones, aromatic hydrocarbons, paraffinic hydrocarbons, and esters (for example, acetic esters). Among all, a fluorine atom-containing organic solvent (for example, fluoroalcohol, fluorohydrocarbon (perfluorohexane, perfluoromethylcyclohexane, perfluoro-1,3-dimethylcyclohexane, dichloropentafluoropropane, and so on), fluoroether ($CF_3CH_2OCF_2CHF_2$ and so on)) is preferable. As the solvent, one kind may be used alone, or two or more kinds may be used in combination. The composition of the present invention may contain a solvent used for producing the compound (1) or the compound (21).

In view of uniformity of the obtained water repellent film, the content of the solvent with respect to the total 100 parts by mass of the compound (1) and the compound (21) is preferably 9900 parts by mass or less, more preferably 2900 parts by mass or less, and can be, for example, 400 to 2900 parts by mass.

<Other Components>

The composition for forming a water repellent film of the present invention can contain other components besides the compound (1), the compound (21), and the solvent within a range not impairing the effect of the present invention. Examples of the other components include fine particles of a metal oxide such as silica, alumina, zirconia, or titania, a dye, a pigment, an antifouling material, a curing catalyst, and various kinds of resins. An addition amount of the other components with respect to 100 parts by mass of a solid content (components excluding the solvent) of the composition for forming a water repellent film is preferably 20 parts by mass or less and more preferably 10 parts by mass or less, and can be, for example, 1 to 10 parts by mass.

It is possible to form the water repellent film by using the composition for forming a water repellent film of the present invention. As a method to form the water repellent film, a known method in a fluorine-containing organosilane compound-based surface treatment agent is usable, and an example of the method is to apply the composition for forming a water repellent film on a surface of a substrate by brushing, flow coating, spin coating, dip coating, squeeze coating, spray coating, or manual coating, and cure the composition for forming a water repellent film, after drying it as required, in the atmosphere or under a nitrogen atmosphere. A curing condition can be appropriately selected, and an example thereof is a condition of a 20 to 50° C. temperature and a 50 to 95% RH humidity. The thickness of the water repellent film is not limited, and is preferably 50 nm or less, and can be, for example, 2 to 20 nm.

[Substrate with a Water Repellent Film]
<Substrate>

A substrate in a substrate with a water repellent film of the present invention is not limited, provided that it is a substrate made of a material typically required to have water repellency. Examples of such a material of the substrate include metal, plastic, glass, ceramic, sapphire, and a combination of these (a composite material, a laminated material, or the like), and among all, glass and sapphire are preferable.

The glass is, for example, soda-lime glass, borosilicate glass, alkali-free glass, or quartz glass, and is preferably soda-lime glass. In a case where the substrate is soda-lime glass, it is preferable to further provide a film that prevents the elusion of $Na^+$ ions, in view of durability. Further, in a case where the substrate is glass manufactured by a float method, the water repellent film is preferably provided on a surface having a less amount of surface tin in view of durability. The glass may be chemically strengthened.

The shape of the substrate is not limited, and can be a plate shape or a shape entirely or partly having a curvature. The thickness of the substrate can be appropriately selected according to the purpose for which it is used, and is preferably 1 to 10 mm.

In the substrate with a water repellent film, the water repellent film is formed on at least part of the substrate. A region, of the substrate surface, where the water repellent film is formed is not limited and can be appropriately selected according to the application. In the case where the substrate has a plate shape, the water repellent film is typically formed entirely on both main surfaces or on one of the main surfaces of the substrate.

<Base Layer>

The substrate with a water repellent film of the present invention can include a base layer between the substrate and the water repellent film. As the base layer, a vapor-deposited film of $SiO_2$ or a film formed using a hydrolyzable silane compound (hereinafter, also referred to as a "base silica layer"), or an anti-reflection layer, or the like is used. Providing such a base layer increases adhesiveness between the water repellent film and the substrate, which can be expected to further improve durability.

(Base Silica Layer)

The base silica layer can be formed using a compound represented by Formula (3): $Si(X^3)_4$ (in the formula, $X^3$'s are each independently an alkoxy group having 1 to 4 carbon atoms, a halogen atom, or an isocyanato group), its partially hydrolyzed condensate, or the like.

Specific examples of the compound (3) include $Si(NCO)_4$, $Si(OCH_3)_4$, and $Si(OC_2H_5)_4$—.

The thickness of the base silica layer is not limited, and is preferably 20 nm or less, and can be, for example, 1 to 10 nm.

(Anti-Reflection Layer)

The anti-reflection layer has a function not only to improve adhesiveness between the water repellent film and the substrate but also to reduce reflectivity. By having the anti-reflection layer, the substrate with a water repellent film has a lower reflectivity than when not having the anti-reflection layer.

Examples of the anti-reflection layer include the following:

(1) an anti-reflection layer with a multilayer structure in which a low-refractive index layer relatively low in refractive index and a high-refractive index layer relatively high in refractive index are alternately stacked; and (2) an anti-reflection layer composed of a low-refractive index layer lower in refractive index than the substrate.

The number of the low-refractive index layers and the high-refractive index layers may be one each, and may be two or more each. In the case where two layers or more of each of the high-refractive index layer and the low-refractive index layer are included, the high-refractive index layers and the low-refractive index layers are preferably alternately stacked.

Materials of the high-refractive index layer and the low-refractive index layer in the anti-reflection layer (1) are not limited, and can be selected in consideration of a required degree of anti-reflection, productivity, and so on. As the material forming the high-refractive index layer, one kind or more selected from niobium oxide ($Nb_2O_5$), titanium oxide ($TiO_2$), zirconium oxide ($ZrO_2$), silicon nitride (SiN), and tantalum oxide ($Ta_2O_5$) can be preferably used, for instance. As the material forming the low-refractive index layer, silicon oxide ($SiO_2$, silica) can be preferably used.

As the anti-reflection layer, it is more preferable that the high-refractive index layer is one selected from a niobium oxide layer, a tantalum oxide layer, and a titanium oxide layer, and the low-refractive index layer is a silicon oxide layer, in view of productivity and a degree of refractive index. The thickness of the anti-reflection layer (1) is preferably 100 to 800 nm, and more preferably 200 to 600 nm.

In the anti-reflection layer (2), the refractive index of the low-refractive index layer is set according to the refractive index of the substrate. For example, in a case where the substrate is glass, the refractive index of the low-refractive index layer is preferably 1.1 to 1.5, and more preferably 1.1 to 1.3.

Examples of the anti-reflection layer (2) include a silica-based porous film having pores in a matrix which is mainly composed of silica. An example of the silica-based porous film is one that includes hollow particles having pores inside and a matrix. The thickness of the anti-reflection layer (2) is preferably 50 to 300 nm, and more preferably 80 to 160 nm.

[Article]

The substrate with a water repellent film of the present invention can be used as, for example, a transportation equipment article such as a transportation equipment window member, a precision instrument article such as window members of cameras or sensors, and an optical article such as a lens. Examples of the transportation equipment include a train, an automobile, a ship, and an airplane. Further, examples of the articles used for these include a body, a window glass (for example, a windshield, side glass, roof glass, and rear glass), a mirror, and a bumper. The transportation equipment article is preferably a transportation equipment window glass, and more preferably an automotive window glass.

The water repellent film of the present invention is not only excellent in water repellency but also excellent in abrasion resistance, particularly in abrasion resistance evaluated under close-to-actual-use conditions where a light resistance test is combined. Therefore, it can keep water repellency even when it is used for a long period under various use conditions, such as outdoor use as a transportation equipment article, and is suitable for this application.

EXAMPLES

In Examples, compositions for forming a water repellent film were prepared, and substrates with a water repellent film were fabricated using the obtained compositions for forming a water repellent film, and they were evaluated. Examples 1 to 3, 6 to 8, 11 to 13, 16, 17 and 20 to 22 are Examples, and examples 4, 5, 9, 10, 14, 15, 18, 19 and 23 to 25 are Comparative Examples. Components blended in the compositions for forming a water repellent film are as follows.

<Compound (1)>
C6Cl:CF$_3$(CF$_2$)$_5$CH$_2$CH$_2$SiCl$_3$ (manufactured by SynQuest)
C6(OMe):CF$_3$(CF$_2$)$_5$CH$_2$CH$_2$Si(OCH$_3$)$_3$ (manufactured by SynQuest)

<Compound (21) and Compound (X)>
As the compound (21), a compound (21-a) to a compound (21-d) were prepared as follows. Further, a compound (X-1) to a compound (X-3) were prepared, which are each a poly(oxyfluoroalkylene) chain-containing silane compound (hereinafter, also referred to as a "compound (X)") that has a poly(oxyfluoroalkylene) chain and a hydrolyzable silyl group but does not correspond to the compound (21).

(Compound (21-a))
As the compound (21-a), a compound (number average molecular weight; 4,430) synthesized by the synthesizing method of the compound 3 of Example 1 of JP-A No. 2015-199906 and represented by the following chemical formula was used.

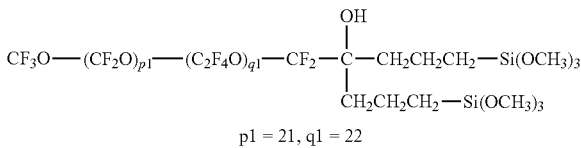

p1 = 21, q1 = 22

(Compound (21-b))
As the compound (21-b), a compound (number average molecular weight; 4,190) synthesized by the synthesizing method of the synthesis example 4 of JP-B No. 5761305 and represented by the following chemical formula was used.
CF$_3$CF$_2$CF$_2$O(CF$_2$CF$_2$CF$_2$O)$_{20}$CF$_2$CF$_2$CH$_2$OCH$_2$CH$_2$CH$_2$Si[CH$_2$CH$_2$CH$_2$Si (OCH$_3$)$_3$]$_3$ (Compound (21-c))
As the compound (21-c), a compound (number average molecular weight; 3,520) synthesized by the synthesizing method of the synthesis example 15 of JP-B No. 5761305 and represented by the following chemical formula was used. CF$_3$O(CF$_2$CF$_2$O)$_{15}$(CF$_2$O)$_{16}$CF$_2$CH$_2$OCH$_2$CH$_2$CH$_2$Si[CH$_2$CH$_2$CH$_2$Si(OCH$_3$)$_3$]$_3$ (Note that its average composition includes 0.17 pieces of repeating units of (CF$_2$CF$_2$CF$_2$CF$_2$O) and 0.18 pieces of repeating units of (CF$_2$CF$_2$CF$_2$O), but their notation is omitted because of their trace amounts.)

(Compound (21-d))
As the compound (21-d), a compound (number average molecular weight; 5,180) synthesized by the synthesizing method of the synthesis example 10 of JP-B No. 5761305 and represented by the following chemical formula was used. CF$_3$CF$_2$CF$_2$O(CF$_2$CF$_2$CF$_2$O)$_{20}$CF$_2$CF$_2$CH$_2$OCH$_2$CH$_2$CH$_2$Si{CH$_2$CH$_2$CH$_2$Si [CH$_2$CH$_2$CH$_2$Si (OCH$_3$)$_3$]$_{2.5}$(OCH$_3$)$_{0.5}$}$_3$ (Compound (X-1))
As the compound (X-1), a compound (number average molecular weight; 4,920) synthesized by the synthesizing method of the compound (ii-2) in WO2014/126064 and represented by the following chemical formula was used. CF$_3$CF$_2$OCF$_2$CF$_2$O(CF$_2$CF$_2$CF$_2$CF$_2$OCF$_2$CF$_2$O)$_{13}$CF$_2$CF$_2$CF$_2$C(O)NHCH$_2$CH$_2$CH$_2$Si(OMe)$_3$ (Compound (X-2))
As the compound (X-2), a compound represented by the following chemical formula and having a number average molecular weight of 4,570 was used.

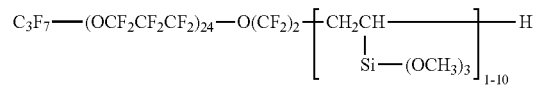

(Compound (X-3))
As the compound (X-3), a mixture of the following compound a, compound b, compound c synthesized by the synthesis methods in Examples of JP-B No. 5814209 was used, with a molar ratio % of the compound a: the compound b: the compound c being 5:80:15. In the mixture, a number average molecular weight was 5,380, and an average number of (CH$_2$)$_3$Si(OCH$_3$)$_3$ per molecule was 3 on average.

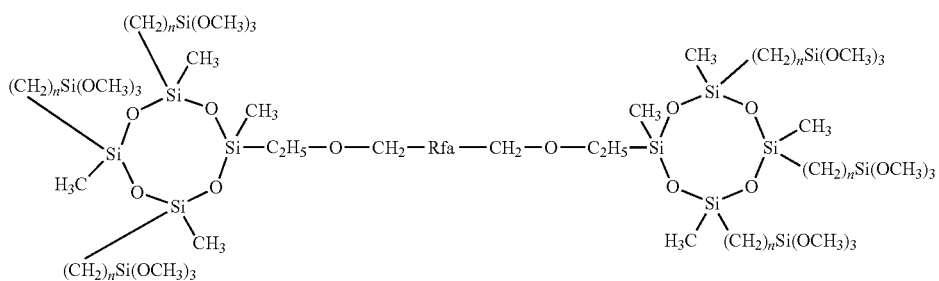

(Compound a)

Rfa: —$CF_2(OC_2F_4)_p(OCF_2)_q$—$OCF_2$-(p=21, q=24), n=3, the number of trialkoxy groups in one molecule is 5 or more on average.

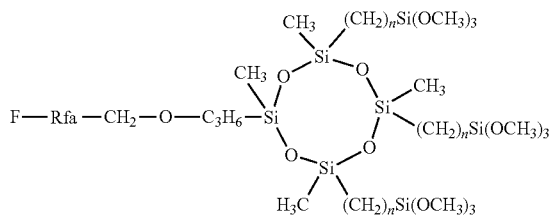

(Compound b)

Rfa: —$CF_2(OC_2F_4)_p(OCF_2)_q$—$OCF_2$— (p=21, q=24), n=3, the number of trialkoxy groups in one molecule is 2.5 or more on average.

(Compound c)
$CF_3(OC_2F_4)_p(OCF_2)_q$—$OCF_3$ (p=21, q=24)

Examples 1 to 25

The compositions for forming a water repellent film to be used for fabricating the substrates with a water repellent film of examples were prepared as follows.

(Preparation of Compositions for Forming a Water Repellent Film 1 to 19)

Using a mixed solvent of butyl acetate (manufactured by Junsei Chemical Co., Ltd.) and hydrofluoroalkyl (AC6000 manufactured by AGC Inc.), where a mass ratio of butyl acetate:AC6000 is 2:8, the compound (1) and the compound (21) were mixed at the molar ratios shown in Tables 1 and 2, with the total amount of these with respect to 100% by mass of the mixed solvent being 3% by mass. First, the mixed solvent was measured and put into a vessel, the compound (21) and the compound (1) were added in the order mentioned, followed by sixty-minute stirring, whereby the compositions for forming a water repellent film were obtained.

(Preparation of Compositions for Forming a Water Repellent Film 23 to 25)

They were prepared in the same manner as the compositions for forming a water repellent film 1 to 19 except that the compound (X) was used instead of the compound (21) and mixed with the compound (1) at the molar ratios shown in Table 3.

(Preparation of Composition for Forming a Water Repellent Film 20)

Using a mixed solvent of isopropyl alcohol (manufactured by Junsei Chemical Co., Ltd.) and hydrofluoroalkyl ether (AE3000 manufactured by AGC Inc.), where a mass ratio of isopropyl alcohol:AE3000 is 2:8, the compound (1) and the compound (21) were mixed at the molar ratios shown in Table 2, with the total amount of these with respect to 100% by mass of the mixed solvent being 3% by mass. First, the mixed solvent was measured and put into a vessel, the compound (21) and the compound (1) were added in the order mentioned, and 60% nitric acid was further dropped in such an amount that its ratio became 0.05% with respect to the total mass of the solution, followed by sixty-minute stirring, whereby the composition for forming a water repellent film 20 was obtained.

(Preparation of Composition for Forming a Water Repellent Film 21)

It was prepared in the same manner as the composition for forming a water repellent film 7 except that the total amount of the compound (1) and the compound (21) was 0.1% by mass with respect to 100% by mass of the mixed solvent.

(Fabrication of Substrates with a Water Repellent Film of Examples 1 to 19, Example 21, and Examples 23 to 25)

Base silica layers were formed as the base layer by the following method, and the compositions for forming a water repellent film prepared in the above-described examples were applied thereon by a squeeze coating method, whereby the substrates with a water repellent film were obtained.

First, tetraisocyanatosilane (manufactured by Matsumoto Fine Chemical Co. Ltd.) was diluted by butyl acetate (Junsei Chemical Co., Ltd.) such that its ratio became 5% by mass, whereby base silica layer-forming compositions were prepared.

As substrates, clean soda-lime glass substrates (five-degree of water contact angle, 300 mm×300 mm×3 mm thickness) each having a surface polished and washed with cerium oxide and dried were used, 0.5 g of the base silica layer-forming compositions obtained above were applied on the surfaces of the glass substrates by a squeeze coating method, followed by one-minute drying at 25° C., whereby the base silica layers (uncured) were formed.

Next, on the surfaces of the formed base silica layers (uncured), 0.5 g of the compositions for forming a water repellent film indicated by the numbers in Tables 1 to 3, which were obtained above in the respective examples, were applied by a squeeze coating method, the resultants were kept in a thermohygrostat set to 50° C. and 60% RH, for 48 hours, whereby water repellent films were formed and at the same time the base silica layers were cured. Next, the surfaces of the water repellent films were wiped with paper waste impregnated with 2-propanol, whereby the substrates with a water repellent film each having the base silica layer and the water repellent film in order from the substrate side were obtained. In the obtained substrates with a water repellent film, the thickness of the base silica layer was 5 nm and the thickness of the water repellent film was 7 nm in all the examples.

(Fabrication of Substrate with a Water Repellent Film of Example 22)

The base silica layer (uncured) was formed in the same manner as in the example 1 except that an application amount of the base silica layer-forming composition was changed to 0.1 g. Next, on a surface of the formed base silica layer (uncured), the composition for forming a water repellent film 21 was applied by a spray method using R-Coater manufactured by ASAHI SUMAC CORPORATION, and the resultant was kept in a thermohygrostat set to 50° C. and 60% RH, for 48 hours, whereby a water repellent film was formed and at the same time the base silica layer was cured, and the substrate with a water repellent film having the base silica layer and the water repellent film in order from the substrate side was obtained. In the obtained substrate with a water repellent film, the thickness of the base silica layer was 5 nm and the thickness of the water repellent film was 7 nm.

Conditions of the spray method were 0.075 MPa of atomizing air, 0.125 MPa of pattern air, 50 mm of gun height, 500 mm/second of gun speed, 8 mm of pitch, and 8 ml/minute of liquid rate.

(Fabrication of Substrate with a Water Repellent Film of Example 20)

The substrate with a water repellent film of the example 20 was fabricated in the same manner as in the example 7 except that the base layer was changed to the following anti-reflection layer formed by a vapor deposition method. The thickness of the obtained water repellent film was 7 nm.

<Formation of Anti-Reflection Layer>

After vacuuming, a glass substrate was kept heated at an about 200° C. set temperature, and thereafter while an Ar gas and an $O_2$ gas were introduced into a thin film forming apparatus, a high-refractive index layer was formed as the first layer by depositing $Ta_2O_5$ to an about 14 nm film thickness by electron beam vapor deposition under an about 0.03 Pa pressure. At this time, the Ar gas and the $O_2$ gas were made to flow to an ion source attached to the film forming apparatus, a 1000 V voltage and a 1000 mA current were applied thereto, and the film forming was performed while argon ions and oxygen ions were assisted on the substrate. In the following, the second to fourth layers were similarly formed while the argon ions and the oxygen ions were assisted on the glass substrate.

Next, a low-refractive index layer was formed as the second layer by depositing $SiO_2$ to an about 33 nm film thickness by electron beam vapor deposition under an about 0.03 Pa pressure. Thereafter, a high-refractive index layer was formed as the third layer in the same manner as the first layer by depositing $Ta_2O_5$ to an about 121 nm film thickness. Next, a low-refractive index layer was formed as the fourth layer in the same manner as the second layer by depositing $SiO_2$ to an about 81 nm film thickness, whereby the anti-reflection layer was obtained by vapor deposition. Consequently, a stack in which the glass substrate and the anti-reflection layer having a four-layer structure were stacked was obtained.

Note that, in Tables 1 to 3, the base layer that is the base silica layer is represented by "silica", and the base layer that is the anti-reflection layer is represented by "AR". Note that Tables 1 to 3 show a mass ratio of the compound (21) (or the compound (X)) to the total of the compound (1) and the compound (21) (or the compound (X)) (in Tables, represented by "compound (21)/[compound (1)+compound (21)] [mass ratio]", or "compound (X)/[compound (1)+compound (X)] [mass ratio]"), a molar ratio of the compound (1) and the compound (2) (or the compound (X)) (in Tables, represented by "(compound (1))/(compound (21) (or compound (X)) [molar ratio]"), and a molar ratio of a group: $SiR^1_pX^1_{3-p}$ in the compound (1) and a group: $SiR^2_rX^2_{3-r}$ in the compound (21) (or the compound (X)) (in Tables, represented by "$SiR^1_pX^1_{3-p}$ in compound (1)/$SiR^2_rX^2_{3-r}$ in compound (21) (or compound (X)) [molar ratio]").

[Evaluation]

The substrates with a water repellent film obtained in the examples described above were evaluated as follows.

<Water Contact Angle>

A contact angle of a waterdrop with a 1 mm diameter placed on the water repellent film surface of each of the substrates with a water repellent film was measured using DM-701 (manufactured by Kyowa Interface Science Co., Ltd). The measurement was conducted at five different places in the water repellent film surface, and an average value thereof was calculated.

<Initial Water Contact Angle>

A water contact angle was measured before tests were conducted. Note that if the initial water contact angle is 110° or more, it can be said that water repellency can be said as being high enough to endure actual use.

<Abrasion Resistance>

On the water repellent film surface of each of the substrates with a water repellent film, Rubber Eraser (manufactured Minoan) was reciprocated ten thousand times at an 80 rpm speed with a 5N load, using a reciprocating plane abrasion tester (PA-300A manufactured by DAIEI KAGAKU SEIKI MFG. CO., LTD.) in conformity with JIS L 0849:2013 (ISO 105-X12:2001), and thereafter a water contact angle was measured. If the water contact angle after the test is 80° or more, abrasion resistance can be said as being high enough for actual use.

<Light Resistance>

The water repellent film surfaces of the substrates with a water repellent film were irradiated with a beam (650 W/m$^2$, 300 to 700 nm) for 3000 hours at a 63° C. black panel temperature, using SUNTEST XLS+ manufactured by TOYOSEIKI, and thereafter a water contact angle was measured by the above-described method. If the water contact angle after the test is 80° or more, light resistance can be said as being high enough for actual use.

<Light and Abrasion Resistance>

During outdoor actual use, deterioration progresses due to a combined factor of abrasion and light. Therefore, an abrasion resistance-light resistance combined test was conducted under the following conditions. In one set of the test, the aforesaid abrasion resistance test with 1000-time reciprocation on the water repellent film surfaces of the substrates with a water repellent film was conducted and then the above-described light-resistance test was conducted for 300 hours, and after five sets of the tests were conducted, a water contact angle was measured. If the water contact angle after the test is 80° or more, light and abrasion resistance can be said as being high enough for actual use.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| Kind of base layer | Silica | Silica | Silica | Silica | Silica | Silica | Silica | Silica | Silica | Silica |
| Coating method of composition for forming a water repellent film | Squeeze | Squeeze | Squeeze | Squeeze | Squeeze | Squeeze | Squeeze | Squeeze | Squeeze | Squeeze |
| Composition for forming a water repellent film number | 1 | 2 | 3 | 4 | 5 | 6 | 7 | 8 | 9 | 10 |
| Compound (1) | C6Cl | C6Cl | C6Cl | C6Cl | C6Cl | C6Cl | C6Cl | C6Cl | C6Cl | C6Cl |
| Compound (21) | | | (21-a) | | | | | (21-b) | | |
| Presence or absence of cyclic siloxane structure | Absent | Absent | Absent | Absent | Absent | Absent | Absent | Absent | Absent | Absent |
| Number of groups (Bt) in compound (21) | 2 | 2 | 2 | 2 | 2 | 3 | 3 | 3 | 3 | 3 |
| Compound (21)/[compound (1) + compound (21)] [mass ratio] | 0.7 | 0.5 | 0.3 | 0.8 | 0.2 | 0.7 | 0.5 | 0.3 | 0.8 | 0.2 |
| (Compound (1))/(compound (21)) [molar ratio] | 4.6 | 10.7 | 24.9 | 2.7 | 42.7 | 4.6 | 10.7 | 24.9 | 2.7 | 42.7 |
| ($SiR^1_p X^1_{3-p}$ in compound (1)/$SiR^2_r X^2_{3-r}$ in compound (21)) [molar ratio] | 2.3 | 5.3 | 12.5 | 1.3 | 21.4 | 1.5 | 3.6 | 8.3 | 0.9 | 14.2 |
| Initial water contact angle [°] | 114 | 114 | 113 | 114 | 111 | 113 | 113 | 111 | 114 | 111 |
| Abrasion resistance [°] | 107 | 104 | 95 | 78 | 78 | 111 | 108 | 96 | 77 | 80 |
| Light resistance [°] | 85 | 94 | 101 | 72 | 102 | 88 | 93 | 101 | 70 | 102 |
| Light and abrasion resistance [°] | 83 | 88 | 87 | 54 | 74 | 89 | 92 | 87 | 58 | 74 |

TABLE 2

| | Example | | | | | | | | | | | |
|---|---|---|---|---|---|---|---|---|---|---|---|---|
| | 11 | 12 | 13 | 14 | 15 | 16 | 17 | 18 | 19 | 20 | 21 | 22 |
| Kind of base layer | Silica | Silica | Silica | Silica | Silica | Silica | Silica | Silica | Silica | AR | Silica | Silica |
| Coating method of composition for forming a water repellent film | Squeeze | Squeeze | Squeeze | Squeeze | Squeeze | Squeeze | Squeeze | Squeeze | Squeeze | Squeeze | Squeeze | Spray |
| Composition for forming a water repellent film number | 11 | 12 | 13 | 14 | 15 | 16 | 17 | 18 | 19 | 7 | 20 | 21 |
| Compound (1) | C6Cl | C6Cl | C6Cl | C6Cl | C6Cl | C6Cl | C6Cl | C6Cl | C6Cl | C6Cl | C6(OMe) | C6Cl |
| Compound (21) | | | (21-c) | | | | | (21-d) | | | (21-b) | |
| Presence or absence of cyclic siloxane structure | Absent | Absent | Absent | Absent | Absent | Absent | Absent | Absent | Absent | Absent | Absent | Absent |
| Number of groups (Bt) in compound (21) | 3 | 3 | 3 | 3 | 3 | 7.5 | 7.5 | 7.5 | 7.5 | 3 | 3 | 3 |
| Compound (21)/ [compound (1) + compound (21)] [mass ratio] | 0.7 | 0.5 | 0.3 | 0.8 | 0.2 | 0.4 | 0.3 | 0.5 | 0.2 | 0.5 | 0.5 | 0.5 |
| (Compound (1))/(compound (21)) [molar ratio] | 4.6 | 10.7 | 24.9 | 2.7 | 42.7 | 16.0 | 24.9 | 10.7 | 42.7 | 10.7 | 10.7 | 10.7 |
| ($SiR^1_p X^1_{3-p}$ in compound (1)/$SiR^2_r X^2_{3-r}$ in compound (21)) [molar ratio] | 1.5 | 3.6 | 8.3 | 0.9 | 14.2 | 2.1 | 3.3 | 1.4 | 5.7 | 3.6 | 3.6 | 3.6 |
| Initial water contact angle [°] | 114 | 114 | 113 | 114 | 111 | 113 | 112 | 113 | 111 | 113 | 113 | 113 |
| Abrasion resistance [°] | 110 | 105 | 95 | 78 | 78 | 105 | 106 | 89 | 79 | 105 | 103 | 107 |
| Light resistance [°] | 85 | 95 | 98 | 73 | 101 | 95 | 97 | 94 | 97 | 93 | 90 | 93 |
| Light and abrasion resistance [°] | 84 | 90 | 85 | 58 | 74 | 89 | 91 | 75 | 70 | 88 | 85 | 90 |

TABLE 3

| Example | 23 | 24 | 25 |
|---|---|---|---|
| Kind of base layer | Silica | Silica | Silica |
| Coating method of composition for forming a water repellent film | Squeeze | Squeeze | Squeeze |
| Composition for forming a water repellent film number | 22 | 23 | 24 |
| Compound (1) | C6Cl | C6Cl | C6Cl |
| Compound (X) | (X-1) | (X-2) | (X-3) |
| Presence or absence of cyclic siloxane structure | Absent | Absent | Present |
| Number of groups (Bt) in compound (X) | 1 | 1 | 3 |
| Compound (X)/[compound (1) + compound (X)] [mass ratio] | 0.5 | 0.5 | 0.5 |
| (Compound (1))/(compound (X)) [molar ratio] | 10.7 | 10.7 | 10.7 |
| ($SiR^1_pX^1_{3-p}$ in compound (1)/$SiR^2_rX^2_{3-r}$ in compound (X)) [molar ratio] | 10.7 | 10.7 | 3.6 |
| Initial water contact angle [°] | 112 | 111 | 113 |
| Abrasion resistance [°] | 88 | 85 | 100 |
| Light resistance [°] | 95 | 93 | 84 |
| Light and abrasion resistance [°] | 79 | 70 | 74 |

As is seen from Tables 1 and 2, the substrates with a water repellent film of Examples are not only excellent in water repellency but also excellent in abrasion resistance, particularly in abrasion resistance evaluated under close-to-actual-use conditions where the light resistance test is combined (light and abrasion resistance) because they each contain the compound (1) and the compound (21) at a predetermined quantitative ratio.

On the other hand, in the examples 4, 9, 14 and 18 which are Comparative Examples, ($SiR^1_pX^1_{3-p}$ in compound (1))/($SiR^2_rX^2_{3-r}$ in compound (21)) [molar ratio] is less than 1.5, which falls out of the range of the present invention, and since an amount of the compound (1) with respect to the compound (21) which is easily aggregated is not sufficient, the obtained compositions for forming a water repellent film do not have uniform properties and are not capable of forming the water repellent film having light and abrasion resistance high enough for actual use. It is also seen that, in the examples 5, 10, 15 and 19 which are Comparative Examples, (compound (1))/(compound (21)) [molar ratio] is over 40, which falls out of the range of the present invention, and since an amount of the compound (21) having an operation to improve light and abrasion resistance is not sufficient with respect to the compound (1), it is not possible to impart light and abrasion resistance high enough for actual use to the obtained water repellent films.

Further, it is seen that, in the examples 23 to 25 which are Comparative Examples in each of which the poly(oxyfluoroalkylene) chain-containing silane compound (X) having the poly(oxyfluoroalkylene) chain and the hydrolyzable silyl group but not corresponding to the compound (21) is used instead of the compound (21), it is not possible to impart light and abrasion resistance high enough for actual use to the obtained water repellent films.

According to the present invention, there is provided a composition for forming a water repellent film that can form a water repellent film not only excellent in water repellency but also excellent in abrasion resistance, particularly in abrasion resistance evaluated under close-to-actual-use conditions where a light resistance test is combined. Further, according to the present invention, it is possible to provide a water repellent film formed using the composition for forming a water repellent film, a substrate with a water repellent film including the water repellent film on at least part of a substrate, and an article, such as a transportation equipment window member, and window members and lenses of cameras and sensors, including the substrate with a water repellent film.

What is claimed is:

1. A composition for forming a water repellent film consisting of:
   a compound represented by Formula (1) below;
   a compound represented by Formula (2) below and having a number average molecular weight of 3000 or more;
   optionally a solvent; and
   optionally other components selected from the group consisting of a dye, a pigment, an antifouling material, a curing catalyst, and a resin,
   wherein a molar ratio of a group $SiR^1_pX^1_{3-p}$ in the compound represented by Formula (1) and a group $SiR^2_rX^2_{3-r}$ in the compound represented by Formula (2) and having the number average molecular weight of 3000 or more ([the number of moles of $SiR^1_pX^1_{3-p}$ in the compound represented by Formula (1)]/the number of moles of $SiR^1_pX^1_{3-p}$ in the compound represented by Formula (2) and having the number average molecular weight of 3000 or more]) is 1.5 to 20, and a molar ratio of the compound represented by Formula (1) and the compound represented by Formula (2) and having the number average molecular weight of 3000 or more ([the number of moles of the compound represented by Formula (1)]/[the number of moles of the compound represented by Formula (2) and having the number average molecular weight of 3000 or more]) is 2 to 40,

$$R^{f1}\text{-}Q^1\text{-}SiR^1_pX^1_{3-p} \qquad \text{Formula. (1)}$$

where, $R^{f1}$ is a group $C_kF_{2k+1}$, where k is an integer of 1 to 8,
$Q^1$ is a bivalent hydrocarbon group having 1 to 6 carbon atoms,
$R^1$'s are each independently a monovalent hydrocarbon group having 1 to 6 carbon atoms,
$X^1$'s are each independently a hydroxyl group or a hydrolyzable group, and
p is an integer of 0 to 2,

$$[A]_{b1}Q^2[B]_{b2} \qquad \text{Formula. (2)}$$

where, $Q^2$ is a linking group having a valency of (b1+b2),
A is a group represented by $R^{f3}\text{—O—}R^{f2}\text{—}$, where $R^{f2}$ is a poly(oxyfluoroalkylene) chain, and $R^{f3}$ is a perfluoroalkyl group,
B is a monovalent group having one —$R^{12}$—($SiR^2_r$—$X^2_{3-r}$), where $R^{12}$ is a hydrocarbon group having 2 to 10 carbon atoms that optionally has an ether oxygen atom between the carbon-carbon atoms or at an end opposite to a side bonded with Si or optionally has —NH— between the carbon-carbon atoms, $R^2$'s are each independently a hydrogen atom or a monovalent hydrocarbon group having 1 to 6 carbon atoms, the hydrocarbon group optionally containing a substituent, $X^2$'s are each independently a hydroxyl group or a hydrolyzable group, and r is an integer of 0 to 2, and including no fluorine atom,
$Q^2$ and B include no cyclic siloxane structure,
b1 is an integer of 1 to 3,
b2 is an integer of 2 to 9, and
in a case where b1 is 2 or more, b1 pieces of A may be identical or different, and b2 pieces of B may be identical or different.

2. The composition for forming a water repellent film according to claim 1, wherein $R^{f2}$ in Formula (2) is a group represented by $-(C_aF_{2a}O)_n-$, where a is an integer of 1 to 6, n is an integer of 2 or more, and the $-C_aF_{2a}O-$ units may be identical or different.

3. The composition for forming a water repellent film according to claim 1, wherein $R^{f2}$ in Formula (2) is a group represented by a group $-CF_2CF_2CF_2CF_2CF_2CF_2O)_{n1}-(CF_2CF_2CF_2CF_2CF_2O)_{n2}-(CF_2CF_2CF_2CF_2O)_{n3}-(CF_2CF_2CF_2O)_{n4}-(CF(CF_3)CF_2O)_{n5}-(CF_2CF_2O)_{n6}-(CF_2O)_{n7}-$, where n1, n2, n3, n4, n5, n6, and n7 are each independently an integer of 0 or more, the sum of n1, n2, n3, n4, n5, n6, and n7 is 2 or more, and the repeating units may exist in block, alternately, or randomly.

4. A water repellent film formed by using the composition for forming a water repellent film according to claim 1.

5. A substrate with a water repellent film comprising a substrate and the water repellent film according to claim 4 on at least part of the substrate.

6. The substrate with a water repellent film according to claim 5 comprising a base layer between the substrate and the water repellent film.

7. The substrate with a water repellent film according to claim 5, wherein the substrate is glass or sapphire.

8. An article comprising the substrate with a water repellent film according to claim 5.

* * * * *